US009569661B2

United States Patent
Xu et al.

(10) Patent No.: US 9,569,661 B2
(45) Date of Patent: Feb. 14, 2017

(54) APPARATUS AND METHOD FOR NECK AND SHOULDER LANDMARK DETECTION

(71) Applicant: Futurewei Technologies, Inc., Plano, TX (US)

(72) Inventors: Jingsong Xu, Sydney (AU); Ying Cui, Sydney (AU); Qiang Wu, Sydney (AU); Jian Zhang, Kensington (AU); Chen-Xiong Zhang, Plano, TX (US); Haibo Liu, Shenzhen (CN); Kui Fang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/719,079

(22) Filed: May 21, 2015

(65) Prior Publication Data

US 2016/0342831 A1 Nov. 24, 2016

(51) Int. Cl.
*G06K 9/00* (2006.01)
*G06T 7/00* (2006.01)

(52) U.S. Cl.
CPC ....... *G06K 9/00362* (2013.01); *G06K 9/00248* (2013.01); *G06T 7/0083* (2013.01); *G06T 7/0091* (2013.01); *G06T 2207/10024* (2013.01); *G06T 2207/20081* (2013.01); *G06T 2207/20152* (2013.01); *G06T 2207/30201* (2013.01)

(58) Field of Classification Search
USPC ......................................................... 382/103
See application file for complete search history.

(56) References Cited

U.S. PATENT DOCUMENTS

| | | | | |
|---|---|---|---|---|
| 5,864,630 A | * | 1/1999 | Cosatto | G06K 9/00234 382/103 |
| 2004/0017933 A1 | * | 1/2004 | Lestideau | G06T 7/20 382/118 |
| 2008/0252722 A1 | * | 10/2008 | Wang | G06K 9/00771 348/143 |
| 2010/0215257 A1 | * | 8/2010 | Dariush | G06K 9/00369 382/159 |
| 2012/0129605 A1 | * | 5/2012 | Livet | G06K 9/00355 463/39 |

\* cited by examiner

*Primary Examiner* — Gregory F Cunningham
(74) *Attorney, Agent, or Firm* — Schwegman Lundberg & Woessner, P.A.

(57) ABSTRACT

A device is configured to perform a method for neck and shoulder detection. The method includes receiving an image that includes a face. The method also includes performing a neck localization operation on the image. The neck localization operation is performed using results from a pretrained regression model. The method further includes performing a shoulder localization operation on the image. The method still further includes estimating a plurality of shoulder and neck keypoints using results of the neck localization operation and the shoulder localization operation.

18 Claims, 5 Drawing Sheets

APPARATUS AND METHOD FOR NECK AND SHOULDER LANDMARK DETECTION

TECHNICAL FIELD

The present disclosure relates generally to object detection, and more particularly, to an apparatus and method for neck and shoulder landmark detection.

BACKGROUND

Neck and shoulder landmark detection is a growing development in object detection and segmentation. Such technology can be applied in many applications including augmented reality and intelligent human-computer interaction in PCs, mobile devices, web applications, and the like. Some neck and shoulder landmark detection techniques are based on general image segmentation based on skin color or background and foreground subtraction; or learning-based methods like snake and graph cut algorithms, and the like. However, in many images, the neck is totally covered or partially covered by cloth. This renders the techniques based on general image segmentation rather unsuccessful. Moreover, visually cluttered environments may also cause bad image segmentation and bad edge detection results. In many cases, the detected shoulder line is not smooth or blended with other regions. Thus, it cannot be applied for high-level applications such as virtual cloth-fitting. In addition, the computational complexity in the existing techniques is high and limits their usage in real-time applications.

SUMMARY

According to one embodiment, there is provided a method of for neck and shoulder detection. The method includes receiving an image that includes a face. The method also includes performing a neck localization operation on the image, the neck localization operation performed using results from a pre-trained regression model. The method further includes performing a shoulder localization operation on the image. The method still further includes estimating a plurality of shoulder and neck keypoints using results of the neck localization operation and the shoulder localization operation.

According to another embodiment, there is provided an apparatus for neck and shoulder detection. The apparatus includes at least one memory and at least one processor coupled to the at least one memory. The at least one processor is configured to receive an image that includes a face; perform a neck localization operation on the image, the neck localization operation performed using results from a pre-trained regression model; perform a shoulder localization operation on the image; and estimate a plurality of shoulder and neck keypoints using results of the neck localization operation and the shoulder localization operation.

According to yet another embodiment, there is provided a non-transitory computer readable medium embodying a computer program. The computer program includes computer readable program code for receiving an image that includes a face; performing a neck localization operation on the image, the neck localization operation performed using results from a pre-trained regression model; performing a shoulder localization operation on the image; and estimating a plurality of shoulder and neck keypoints using results of the neck localization operation and the shoulder localization operation.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Some conventional neck and shoulder detection algorithms rely on skin color segmentation to determine the corresponding face and neck region. Once a neck is detected in an image, the contour is then extracted and is analyzed according to the face and neck shape. However, such techniques often do not provide an accurate neck location. Moreover, such segmentation often does not provide desirable results when dealing with complex environments. For example, the detected contour may not be smooth enough to find the required corners for locating the neck. Some shoulder contour extraction methods follow a procedure for image segmentation similar to that described above for neck detection. Such methods apply foreground and background segmentation techniques to detect the shoulder, which is regarded as being part of the foreground. Alternatively, the methods use cloth color to segment the upper body. However, such methods fail to segment very colorful cloth, or cloth with large random patterns.

More advanced detection methods include energy based edge detection, such as the conventional "snake" algorithm. The snake algorithm defines the energy for a shape and tries to maximize energy around a predefined shape. The "Grab cut" algorithm, which is modeled on the "Graph cut" algorithm, iteratively performs segmentation after providing initial background and foreground information. However such iterative or learning based methods are generally too complicated to be applied in real-time applications.

In some systems, virtual cloth-fitting performance may rely on the accuracy of neck and shoulder landmark detection. Other systems may address aspects of virtual cloth fitting in an electronic device such as a mobile phone. The detection of shoulder and neck landmarks for virtual cloth fitting can be achieved using some of the existing methods described above. However, as mentioned above, these existing methods have various limitations. Thus, embodiments of this disclosure provide improved methods for shoulder and neck detection.

The embodiments disclosed herein provide apparatus and methods for neck and shoulder landmark detection that are able to provide smooth neck and shoulder edges and perform well in real-time applications. Some of the disclosed embodiments can be summarized as follows.

Given an image, a human face is first detected, which determines a candidate region of the neck. The neck location is obtained by combining the results of skin color segmentation and the neck position prediction using a pre-trained regression model. The regression model is developed based on training data according to the statistical relationship between facial landmark points and neck location. Given the locations of the detected face, facial landmark points, and neck, one or more shoulder candidate locations are estimated. Then, one or more shoulder contours are detected using edge detection and watershed segmentation. Since the detected shoulder contours normally are not smooth due to a cluttered background, a curve for the contour points is then fitted. Finally the points of intersection at the shoulder edges, arm edges, and neck are estimated.

Figure 1:
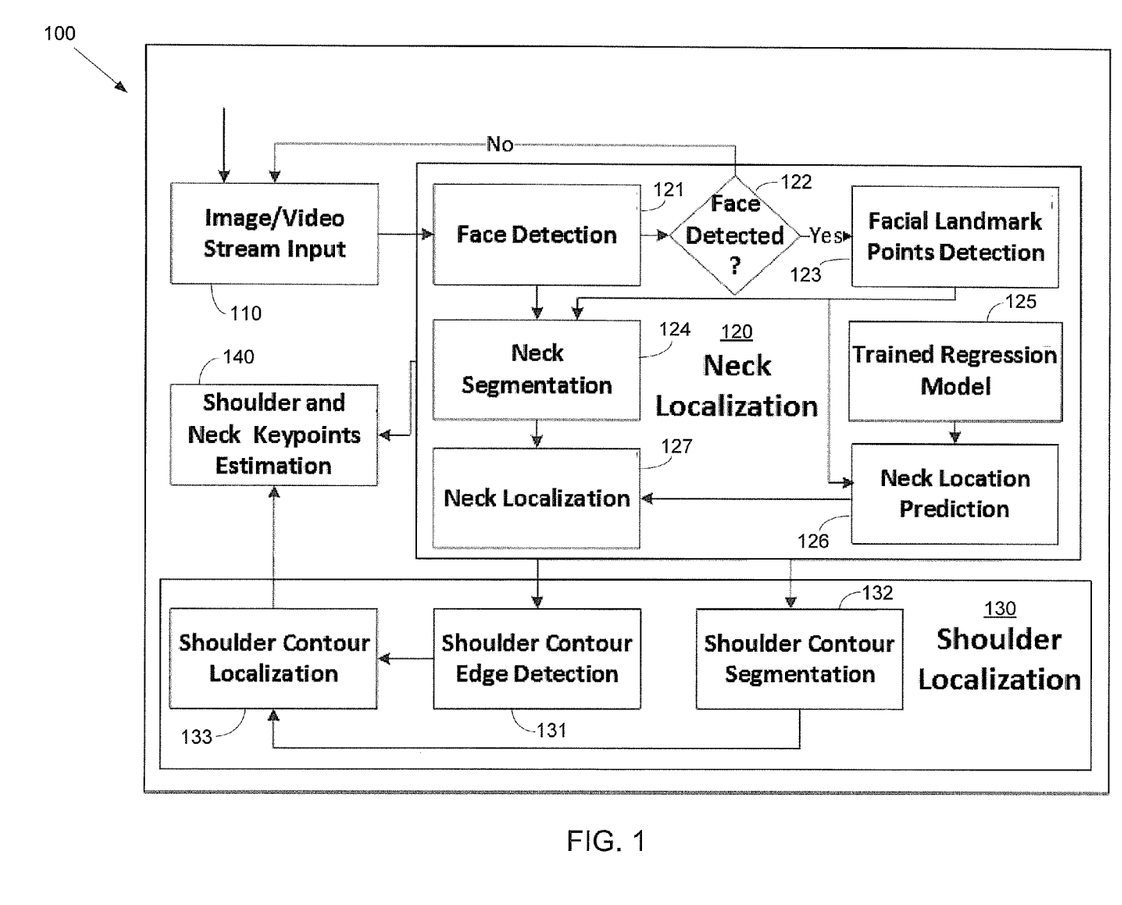
FIG. 1 illustrates an example method for detecting neck and shoulder landmarks in an image, according to this disclosure.

FIG. 1 illustrates an example method for detecting neck and shoulder landmarks in an image, according to this disclosure. For ease of explanation, the method 100 is described as being used with one or more computing devices capable of image processing, such as the computing device 600 of FIG. 6 (described below). However, the method 100 could be used by any suitable device and in any suitable system.

Figure 3A:
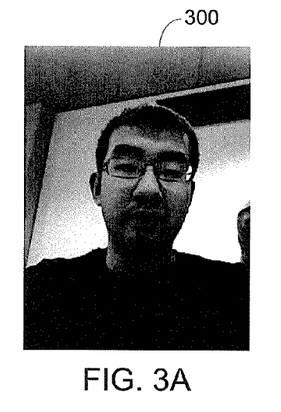
FIGS. 3A through 3H illustrate various operations of a neck and shoulder location detection method, according to this disclosure.

At operation 110, an input image or an image sequence from a video is received. An example image 300 is shown in FIG. 3A. At operation 120, neck localization is performed on the image, in order to determine a neck region associated with a face in the image. The neck localization operation 120 includes multiple operations that are described in greater detail below. Using the results of the neck localization operation 120, a shoulder localization operation is performed at 130 to determine a shoulder region in the image. The shoulder localization operation 130 also includes multiple operations that are described in greater detail below. Then, at operation 140, a plurality of shoulder and neck keypoints are estimated using the results of the neck localization operation 120 and the shoulder localization operation 130.

Neck Localization

Figure 3B:
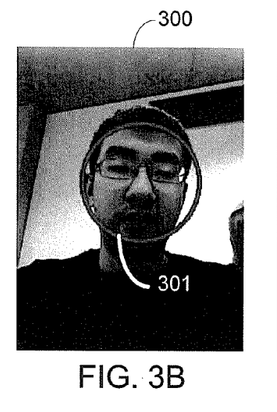

The neck localization operation 120 includes multiple operations that will now be described in greater detail. As noted above, an input image or an image sequence from a video footage is received at operation 110. At operation 121, face detection is performed to determine if there are one or more faces or face regions in the image. Face detection methods such as boosting in OpenCV or skin color detection methods can be performed here. A number of human face detection algorithms are mature and reliable, and are therefore suitable for use. At operation 122, it is determined if a face is detected in operation 121. If no face is detected, then the method 100 returns to step 110. Alternatively, if a face is detected, then the method 100 continues to operation 123. FIG. 3B illustrates a face 301 detected in the image 300.

Figure 2:
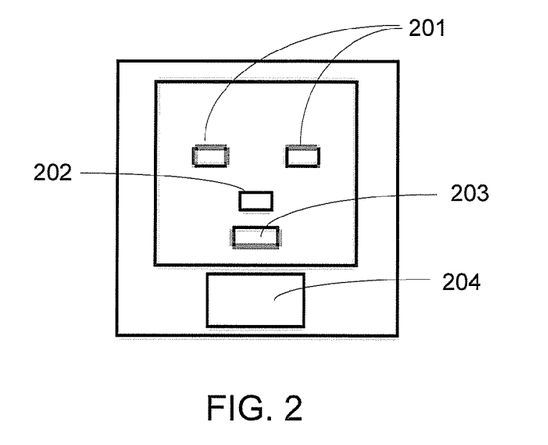
FIG. 2 illustrates an example of facial landmarks in an image, according to this disclosure.
Figure 3C:
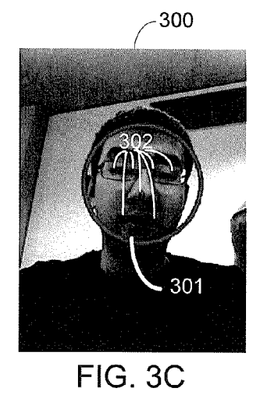
Figure 3D:
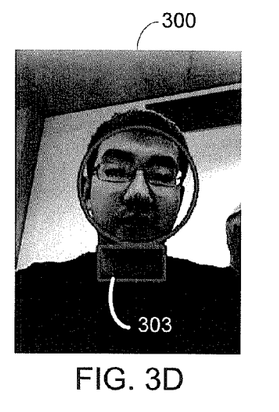
Figure 3E:
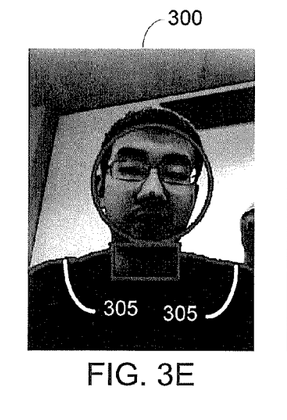

At operation 123, facial landmark point detection is performed on the detected face, which identifies particular facial landmarks, including eyes, nose, mouth, and the like. FIG. 3C illustrates a plurality of detected facial landmark points 302 in the image 300. A candidate neck position is determined by performing two operations (operation 124 and operation 126) in parallel. At operation 124, skin color based image segmentation and skin color analysis is performed on the candidate neck position. At operation 126, neck position prediction is performed by fitting or predicting a neck location using results from a pre-trained regression model 125 that maps predetermined relationships between multiple facial landmark positions and corresponding neck positions. The regression model 125 is used to establish a relationship between the identified facial landmarks and the neck. For example, one illustration of a spatial relationship between facial landmarks (e.g., eyes 201, nose 202, mouth 203) and neck 204 is shown in FIG. 2. FIG. 3D also illustrates a predicted neck region 303 in the image 300.

At operation 127, the results of operation 124 and 126 are combined to obtain the final neck localization. For example, the results of operation 124 and operation 126 can be integrated such that one or more vertical coordinators of the neck position are based on the results from operation 126. Similarly, one or more horizontal coordinators of the neck position are based on the intersections of regions detected by operation 124 and operation 126. In some embodiments, if a collar is present in the image 300, the horizontal coordinators are adjusted in order to make sure that the width of the neck is positioned inside the width of the collar.

Shoulder Localization

Figure 5:
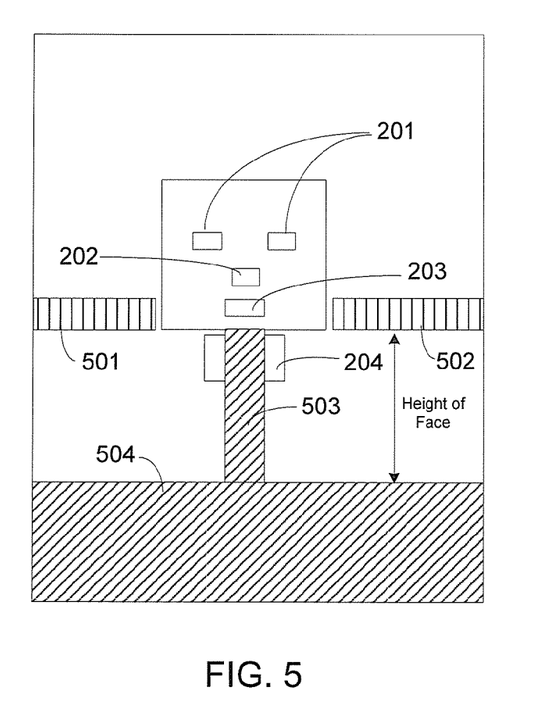
FIG. 5 illustrates candidate regions for a watershed algorithm.

The shoulder localization operation 130 includes multiple operations that will now be described in greater detail. Using the image received at operation 110, one or more shoulder contour edges or edge points are detected at operation 131. This can include determining candidate regions for shoulder contour detection, and then detecting the shoulder contour through an edge detection method known in the art, such as Canny edge detection. The segments of the detected edges are linked together. In operation 132, one or more shoulder contour segmentations are performed to determine the contour of the shoulders. A watershed algorithm can be used to segment the background regions and foreground regions (i.e., the neck and shoulders), as known in the art. The initial background and foreground regions for the watershed algorithm can be obtained according to the position of the detected face landmarks. For example, as shown in FIG. 5, the regions above the neck 204 except the head region are regarded as background (see, e.g., regions 501 and 502). Other regions are regarded as foreground. For example, in order to locate a reliable position to accommodate the virtual cloth, the system defines two foreground regions: region 503 and region 504. The region 504 is a part of the torso. The region 503 represents a location where the neck 204 may shift up or down because of an occasional change of head posture. The height of the region 503 is set as the height of the face.

Figure 3F:
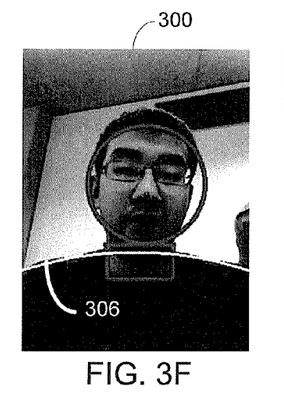

At operation 133, shoulder contour localization is performed by combining detection results of the shoulder contour edge point detection operation 131 and the shoulder contour segmentation operation 132. A quadratic curve 306 is fitted using the contour edge points 305 shown in FIG. 3E. The quadratic curve 306 provides a smooth shoulder contour as shown in FIG. 3F.

Shoulder and Neck Keypoints Estimation

Figure 3G:
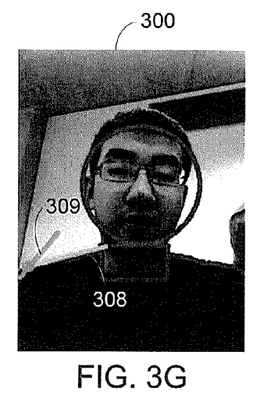
Figure 3H:
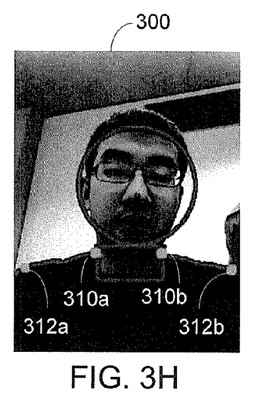

The Shoulder and Neck Keypoints Estimation operation 140 will now be described in greater detail. After shoulder contour detection, shoulder and neck keypoints are estimated at operation 140. As shown in FIG. 3H, these keypoints include two keypoints for each shoulder: (1) a start point (i.e., a point of intersection between the shoulder and the neck) 310a-310b, which can be obtained after the neck localization operation 120 and the shoulder localization operation 130; and (2) a shoulder endpoint (i.e., a point of intersection between the shoulder and the arm) 312a-312b.

In order to estimate the shoulder endpoint 312a-312b, the width of the shoulder is estimated based on one or more anatomically determined, statistical relationships between the shoulder width and the neck width. The position at the shoulder contour is regarded as a candidate shoulder endpoint given the distance satisfying the statistical relationship (s) between the shoulder width and the neck width. To determine a more precise position for each shoulder endpoint 312a-312b, two separate lines are fitted, as shown in FIG. 3G: a line 308 linking the start point to the endpoint, and a line 309 linking the endpoint to the last point of the actually detected shoulder contour. Finally the distance from the intersection of the two fitted lines 308-309 to the start point 310a is recorded. The position at the detected shoulder contour with the same distance as the one between this fitted line intersection point and start point is taken as the final shoulder endpoint 312a-312b. While FIG. 3G shows this process for only one shoulder, it will be understood that the same process is applied to both shoulders to determine both final shoulder endpoints 312a-312b.

Although FIG. 1 illustrates one example of a method 100 for detecting neck and shoulder landmarks in an image, various changes may be made to FIG. 1. For example, while shown as a series of steps, various steps in FIG. 1 could overlap, occur in parallel, occur in a different order, or occur any number of times.

The regression model 125 employed in the neck localization operation 120 describes the relationship between facial landmarks and the neck. In some embodiments, the regression model 125 can be developed over time though a training process, which will now be described in detail.

Figure 4:
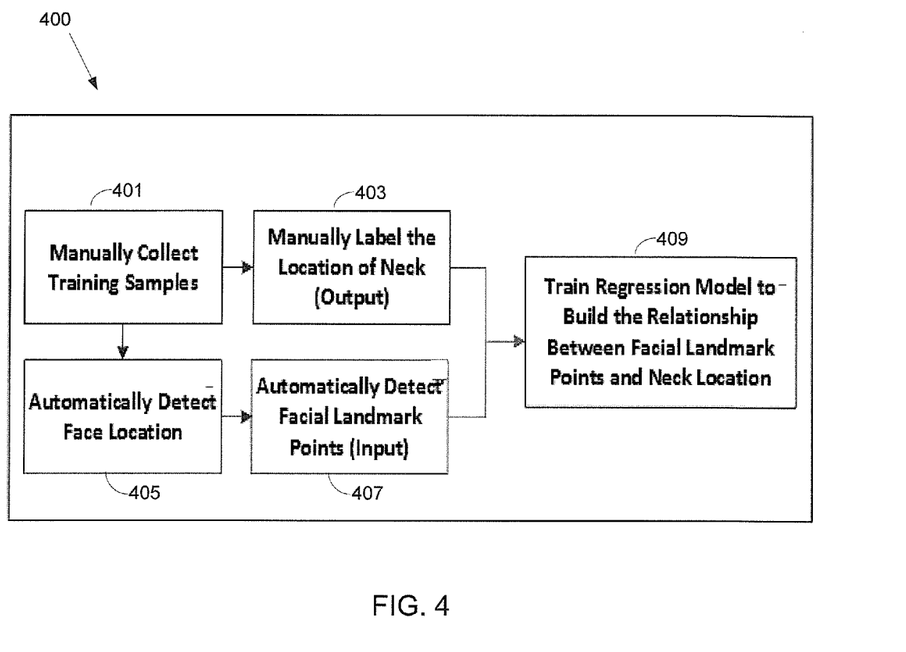
FIG. 4 illustrates an example method for regression model training for detection of neck and shoulder landmarks, according to this disclosure.

FIG. 4 illustrates an example method for regression model training for detection of neck and shoulder landmarks, according to this disclosure. For ease of explanation, the method 400 is described as being used with one or more computing devices capable of image processing, such as the computing device 600 of FIG. 6 (described below). However, the method 400 could be used by any suitable device and in any suitable system. The results of the method 400 could include the regression model 125.

As shown in FIG. 4, the method 400 starts with operation 401, where multiple facial image samples are collected, including images with male faces and images with female faces. This may include one or more users identifying, collecting, or assembling a large number of still or moving images (e.g., about one thousand or two thousand images) that are to be analyzed, and then loading, importing, or saving the images as data records in the training environment. In some embodiments, each of the collected images includes a face region and a neck region. Superior training results are developed using diverse image samples that include many different facial shapes, features, and sizes.

At operation 403, each image sample is labelled with the actual location of the neck or neck region in the image sample. This may include a user manually labelling the neck or neck region in the image sample. For example, if the image sample is displayed on a display such as computer screen, the user may move a pointer on the display to the neck region, and then select and mark the neck region by clicking on the neck region. In other embodiments, the neck region may be marked as a two-dimensional space by drawing a line or box around the neck region.

At operation 405, face detection is automatically performed to determine a candidate face region for facial landmark detection. This may include performing operations that are the same as or similar to the face detection operation 121 of FIG. 1. In particular, this may include executing one or more face detection algorithms such as OpenCV or skin color detection.

At operation 407, facial landmark point detection is automatically performed on the candidate region determined at operation 405. This may include performing operations that are the same as or similar to the facial landmark points detection 123 of FIG. 1.

At operation 409, the regression model 125 is trained based on the results of operations 407 and 403. In order to train the regression model 125, one or more regression methods are employed. For example, in some embodiments, support vector regression is employed based on its superior test results. Of course, those of skill in the art will recognize that other regression methods may be used, such as linear regression.

The regression model 125 can be developed using different facial landmarks. In some embodiments, the locations of the eyes, nose and mouth can be used to build the regression model 125 for the location of neck, as shown in FIG. 2. Those of skill in the art will recognize that the number and types of landmark points for training the regression model 125 can be changed according to purposes. For a given pre-trained regression model 125, the inputs to the model are distances from different facial keypoints to the center point of the face image; the output to the model 125 includes the distance from the neck to the center point of the face image. Homogenous linear equations are adopted.

The training method 400 is an offline process that can take a day, a week, a month, or any other suitable time period and may be performed on a large number of images. In general, the more images that are used, the more stable the detection process becomes. Once the training is completed, the training information is no longer needed. The trained regression model 125 generated by the training can then be applied in a runtime environment, such as an executable application in a smart phone.

Although FIG. 4 illustrates one example of a method 400 for regression model training, various changes may be made to FIG. 4. For example, while shown as a series of steps, various steps in FIG. 4 could overlap, occur in parallel, occur in a different order, or occur any number of times. Also, while the number of image samples is described as about one thousand or two thousand images, the number could vary widely between implementations and could be much larger or much smaller, depending on implementation.

As described above, embodiments of this disclosure provide a novel method for neck detection by analyzing the relationship between multiple neck and facial landmark points. The disclosed embodiments also provide a new method for shoulder contour detection by integrating techniques for edge detection and image segmentation. Another benefit of the disclosed embodiments is a novel method for smooth shoulder boundary construction by fitting the detected shoulder key points through a quadratic line (which significantly improves the performance for the application of virtual cloth-fitting). This methods are highly accurate and are of sufficiently low complexity, such that the methods can be implemented and executed in real-time in a wide variety of consumer electronic devices, including cell phones, tablets, laptops, digital cameras, and the like.

Figure 6:
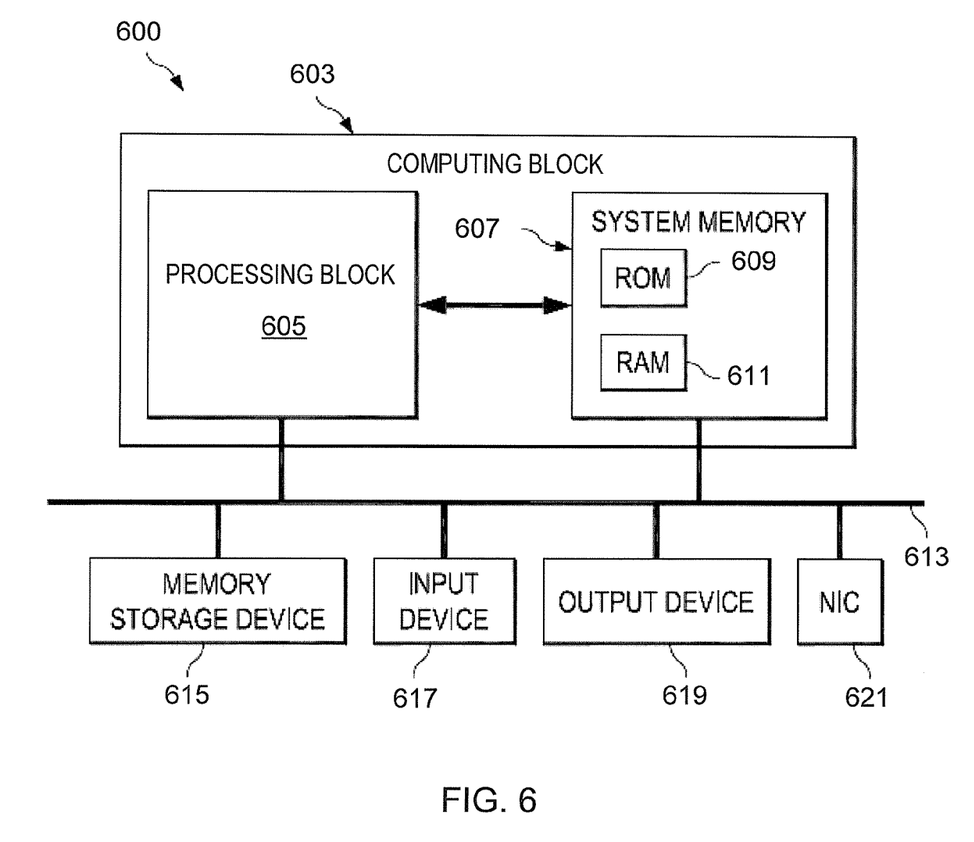
FIG. 6 an example computing device for performing the methods described herein.

FIG. 6 illustrates an example of a computing device 600 for performing the neck and shoulder landmark detection method 100 of FIG. 1 or the regression model training method 400 of FIG. 4. As shown in FIG. 6, the computing device 600 includes a computing block 603 with a processing block 605 and a system memory 607. The processing block 605 may be any type of programmable electronic device for executing software instructions, but will conventionally be one or more microprocessors. The system memory 607 may include both a read-only memory (ROM) 609 and a random access memory (RAM) 611. As will be appreciated by those of skill in the art, both the read-only memory 609 and the random access memory 611 may store software instructions for execution by the processing block 605.

The processing block 605 and the system memory 607 are connected, either directly or indirectly, through a bus 613 or alternate communication structure, to one or more peripheral devices. For example, the processing block 605 or the system memory 607 may be directly or indirectly connected to one or more additional memory storage devices 615. The memory storage devices 615 may include, for example, a "hard" magnetic disk drive, a solid state disk drive, an optical disk drive, and a removable disk drive. The processing block 605 and the system memory 607 also may be directly or indirectly connected to one or more input devices 617 and one or more output devices 619. The input devices 617 may include, for example, a keyboard, a pointing device (such as a mouse, touchpad, stylus, trackball, or joystick), a touch screen, a scanner, a camera, and a microphone. The output devices 619 may include, for example, a display device, a printer and speakers. Such a display device may be configured to display video images. With various examples of the computing device 600, one or more of the peripheral devices 615-619 may be internally housed with the computing block 603. Alternately, one or more of the peripheral devices 615-619 may be external to the housing for the computing block 603 and connected to the bus 613 through, for example, a Universal Serial Bus (USB) connection or a digital visual interface (DVI) connection.

With some implementations, the computing block 603 may also be directly or indirectly connected to one or more network interfaces cards (NIC) 621, for communicating with other devices making up a network. The network interface cards 621 translate data and control signals from the computing block 603 into network messages according to one or more communication protocols, such as the transmission control protocol (TCP) and the Internet protocol (IP). Also, the network interface cards 621 may employ any suitable connection agent (or combination of agents) for connecting to a network, including, for example, a wireless transceiver, a modem, or an Ethernet connection.

It should be appreciated that the computing device 600 is illustrated as an example only, and it not intended to be limiting. Various embodiments of this disclosure may be implemented using one or more computing devices that include the components of the computing device 600 illustrated in FIG. 6, or which include an alternate combination of components, including components that are not shown in FIG. 6. For example, various embodiments of the invention may be implemented using a multi-processor computer, a plurality of single and/or multiprocessor computers arranged into a network, or some combination of both.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for neck and shoulder detection, the method comprising:
   receiving, by one or more microprocessors, an image that includes a face;
   performing, by the one or more microprocessors, a neck localization operation on the image, the neck localization operation performed using results from a pre-trained regression model;
   performing, by the one or more microprocessors, a shoulder localization operation on the image; and
   estimating, by the one or more microprocessors, a plurality of shoulder and neck keypoints using results of the neck localization operation and the shoulder localization operation.

2. The method of claim 1, wherein the neck localization operation comprises:
   detecting, by the one or more microprocessors, at least one face in the image;
   detecting, by the one or more microprocessors, a plurality of facial landmarks in the detected at least one face; and
   determining, by the one or more microprocessors, a candidate neck position based on the detected plurality of facial landmarks and at least one predetermined relationship between facial landmark positions and a corresponding neck position, the predetermined relationship associated with the pre-trained regression model.

3. The method of claim 2, wherein the neck localization operation further comprises:
   performing, by the one or more microprocessors, skin color based image segmentation and skin color analysis on the candidate neck position.

4. The method of claim 2, wherein the shoulder localization operation comprises:
   detecting, by the one or more microprocessors, one or more shoulder contour edges using the detected at least one face and locations of the detected plurality of facial landmarks;
   determining, by the one or more microprocessors, a contour of the shoulders by performing one or more shoulder contour segmentations; and
   fitting, by the one or more microprocessors, a quadratic curve along the shoulder contour using the one or more shoulder contour edges.

5. The method of claim 4, wherein the one or more shoulder contour segmentations are performed using a watershed algorithm.

6. The method of claim 1, wherein the pre-trained regression model is developed over time using a plurality of images having manually labelled neck regions and a support vector regression technique.

7. An apparatus for neck and shoulder detection, the apparatus comprising:
   at least one memory that stores instructions; and
   at least one microprocessor coupled to the at least one memory, the at least one microprocessor configured by the instructions to perform operations comprising:
      receiving an image that includes a face;
      performing a neck localization operation on the image, the neck localization operation performed using results from a pre-trained regression model;
      performing a shoulder localization operation on the image; and
      estimating a plurality of shoulder and neck keypoints using results of the neck localization operation and the shoulder localization operation.

8. The apparatus of claim 7, wherein the neck localization operation comprises:
   detecting at least one face in the image;
   detecting a plurality of facial landmarks in the at least one detected face; and
   determining a candidate neck position based on the detected plurality of facial landmarks and at least one predetermined relationship between facial landmark positions and a corresponding neck position, the predetermined relationship associated with the pre-trained regression model.

9. The apparatus of claim 8, wherein the neck localization operation further comprises:
   performing skin color based image segmentation and skin color analysis on the candidate neck position.

10. The apparatus of claim 8, wherein the shoulder localization operation comprises:
    detecting one or more shoulder contour edges using the detected at least one face and locations of the detected plurality of facial landmarks;
    determining a contour of the shoulders by performing one or more shoulder contour segmentations; and
    fitting a quadratic curve along the shoulder contour using the one or more shoulder contour edges.

11. The apparatus of claim 10, wherein the performing of the one or more shoulder contour segmentations comprises using a watershed algorithm.

12. The apparatus of claim 7, wherein the pre-trained regression model is developed over time using a plurality of images having manually labelled neck regions and a support vector regression technique.

13. A non-transitory computer readable medium that stores instructions which, when executed by one or more microprocessors, cause the one or more microprocessors to perform operations comprising:
    receiving an image that includes a face;
    performing a neck localization operation on the image, the neck localization operation performed using results from a pre-trained regression model;
    performing a shoulder localization operation on the image; and
    estimating a plurality of shoulder and neck keypoints using results of the neck localization operation and the shoulder localization operation.

14. The non-transitory computer readable medium of claim 13, wherein the neck localization operation comprises:
    detecting at least one face in the image;
    detecting a plurality of facial landmarks in the at least one detected face; and
    determining a candidate neck position based on the detected plurality of facial landmarks and at least one predetermined relationship between facial landmark positions and a corresponding neck position, the predetermined relationship associated with the pre-trained regression model.

15. The non-transitory computer readable medium of claim 14, wherein the neck localization operation further comprises:
    performing skin color based image segmentation and skin color analysis on the candidate neck position.

16. The non-transitory computer readable medium of claim 14, wherein the shoulder localization operation comprises:
    detecting one or more shoulder contour edges using the detected at least one face and locations of the detected plurality of facial landmarks;
    determining a contour of the shoulders by performing one or more shoulder contour segmentations; and
    fitting a quadratic curve along the shoulder contour using the one or more shoulder contour edges.

17. The non-transitory computer readable medium of claim 16, wherein the one or more shoulder contour segmentations are performed using a watershed algorithm.

18. The non-transitory computer readable medium of claim 13, wherein the pre-trained regression model is developed over time using a plurality of images having manually labelled neck regions and a support vector regression technique.

* * * * *

UNITED STATES PATENT AND TRADEMARK OFFICE
CERTIFICATE OF CORRECTION

| | | |
|---|---|---|
| PATENT NO. | : 9,569,661 B2 | Page 1 of 1 |
| APPLICATION NO. | : 14/719079 | |
| DATED | : February 14, 2017 | |
| INVENTOR(S) | : Xu et al. | |

It is certified that error appears in the above-identified patent and that said Letters Patent is hereby corrected as shown below:

In Column 6, Line 29, delete "Homogenous" and insert --Homogeneous-- therefor

Signed and Sealed this
Tenth Day of April, 2018

Andrei Iancu
*Director of the United States Patent and Trademark Office*